No. 681,319. Patented Aug. 27, 1901.
E. A. HOLCOMB.
LINE GUIDE.
(Application filed Nov. 5, 1900.)
(No Model.)
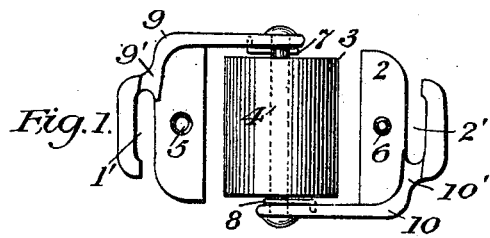
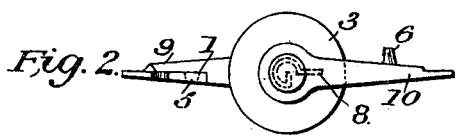
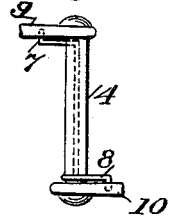
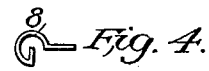
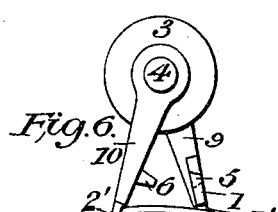
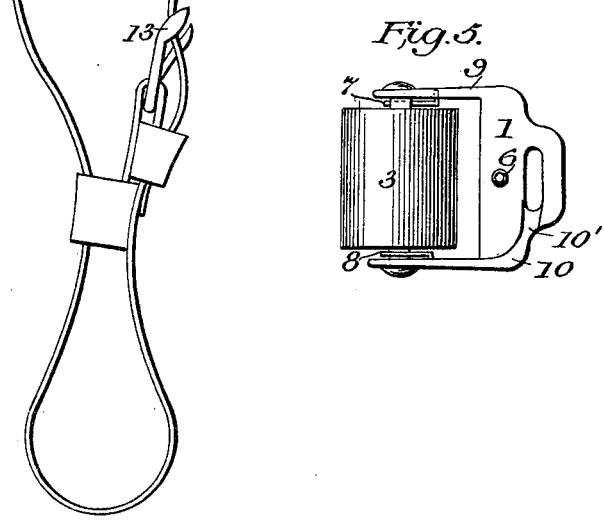
Witnesses:
Geo. R. Turner
M. E. Kennedy.
Inventor:
Ellsworth A. Holcomb
by G. C. Kennedy,
his Attorney.
THE NORRIS PETERS CO., PHOTO-LITHO., WASHINGTON, D. C.

UNITED STATES PATENT OFFICE.

ELLSWORTH A. HOLCOMB, OF WATERLOO, IOWA.

LINE-GUIDE.

SPECIFICATION forming part of Letters Patent No. 681,319, dated August 27, 1901.

Application filed November 5, 1900. Serial No. 35,590. (No model.)

*To all whom it may concern:*

Be it known that I, ELLSWORTH A. HOLCOMB, a citizen of the United States of America, and a resident of the city of Waterloo, Blackhawk county, and State of Iowa, have invented certain new and useful Improvements in Line-Guides, of which the following is a specification.

My invention relates to improvements in line-guides; and its objects are to provide means for a quick insertion of the line and spreader-strap in the guide and the more perfect retention of the parts of the guide in place when closed together. I attain these objects by the means illustrated in the accompanying drawings, in which—

Figure 1 is a plan view of the line-guide, showing the separable halves of the frames spread apart with the springs in operative position. Fig. 2 is a side elevation of the same. Fig. 3 is a detail of the construction, showing the method of applying an equivalent form of spring to the pivot-bolt and arms of the frames. Fig. 4 is a detail view of the form of spring shown in Fig. 1. Fig. 5 is a plan view of the line-guide with the frames closed together; and Fig. 6 is a side elevation of the guide, showing the frames spread apart and the spreader-strap as inserted into the registering apertures.

Similar numbers refer to similar parts throughout the several views.

The frames 1 and 2 are pivoted at the ends of their arms 9 and 10, respectively, to the ends of the pivot-bolt 4, with the roller 3 between them, all being revolubly mounted about said pivot-bolt.

The frames 1 and 2 are respectively furnished with slotted apertures 1' and 2', which register when the frames are closed together. The apertures 1' and 2' are left open at opposite ends, respectively, to permit the introduction of the spreader-strap. When the frames 1 and 2 are closed together, the flange 9' of the arm 9 and the flange 10' of the arm 10 close the openings at the ends of the apertures 2' and 1', locking the frames together and preventing egress of the spreader-strap. The frames 1 and 2 are also provided, respectively, with the hole 5 and stud 6, and when brought together the stud 6 enters and engages with the sides of the hole 5, preventing movements of one plate of the frames upon the other. Springs 7 and 8 are attached to the pivot-bolts and the arms of the frames, the inner ends of the springs being inserted into holes in the pivot-bolt and their outer ends into holes in the inner sides of the frames. The springs aid in keeping the inner faces of the frames together. An equivalent form of spring and its manner of connection to the pivot-bolt by being set into a recess in the latter are shown in Fig. 3.

In operation the frames 1 and 2 are spread apart and the line slipped between them and the roller 3, the roller acting as an antifriction-bearing for the line. The spreader-strap 12, without withdrawing it from the buckle 13, is then inserted into the apertures 1' and 2' through the openings at their ends. The frames are then closed together, the springs 7 and 8 assisting the operation and keeping the parts in engagement.

I do not broadly claim a form of line-guide composed of two frames having the ends of their arms mounted revolubly at either end of a pivot-bolt on which an antifriction-roller is revolubly mounted between the arms of said frames; but What I do claim as new, and desire to secure by Letters Patent of the United States, is—

1. A line-guide comprising frames having the ends of their arms revolubly mounted about the ends of a pivot-bolt, said frames provided with apertures having open ends oppositely arranged, and having flanges on their inner sides adapted to close the open ends of said apertures, and a roller revolubly mounted on said pivot-bolt, all substantially as shown and described.

2. A line-guide comprising frames having the ends of their arms revolubly mounted about the ends of a pivot-bolt, said frames provided with apertures having open ends oppositely arranged, and having flanges on their inner sides adapted to close the open ends of said apertures, one of said frames being provided with a stud adapted to engage with a hole in the other frame, springs adapted to keep the said frames in engagement with each other, and a roller revolubly mounted on said pivot-bolt, all substantially as shown and described.

3. A line-guide comprising in combination a pivot-bolt, a roller revolubly mounted thereon, frames having the ends of their arms revolubly mounted on said pivot-bolt, said frames provided with apertures having open ends oppositely arranged and having flanges on their inner sides adapted to close the open ends of said apertures, one of said frames being provided with a stud adapted to engage with a hole in the other frame, all substantially as shown and described.

4. A line-guide comprising a pivot-bolt, frames having arms revolubly mounted on said pivot-bolt and provided with apertures having open ends oppositely arranged and having flanges on their inner sides adapted to close the open ends of said apertures, springs attached to the pivot-bolt and to the arms of said frames adapted to keep said frames in engagement with each other, and a roller revolubly mounted on said pivot-bolt between the ends of the arms of said frames, all substantially as shown and described.

Signed at Waterloo, Iowa, this 27th day of October, 1900.

ELLSWORTH A. HOLCOMB.

Witnesses:
J. N. WINIMYER,
GEO. R. TURNER.